Sept. 16, 1969  G. M. MOTIS  3,466,944
SOLENOID ELBOW

Filed Aug. 22, 1966  3 Sheets-Sheet 1

INVENTOR.
GILBERT M. MOTIS,
By His Attorneys
Spensley & Horn.

Sept. 16, 1969  G. M. MOTIS  3,466,944
SOLENOID ELBOW
Filed Aug. 22, 1966  3 Sheets-Sheet 2
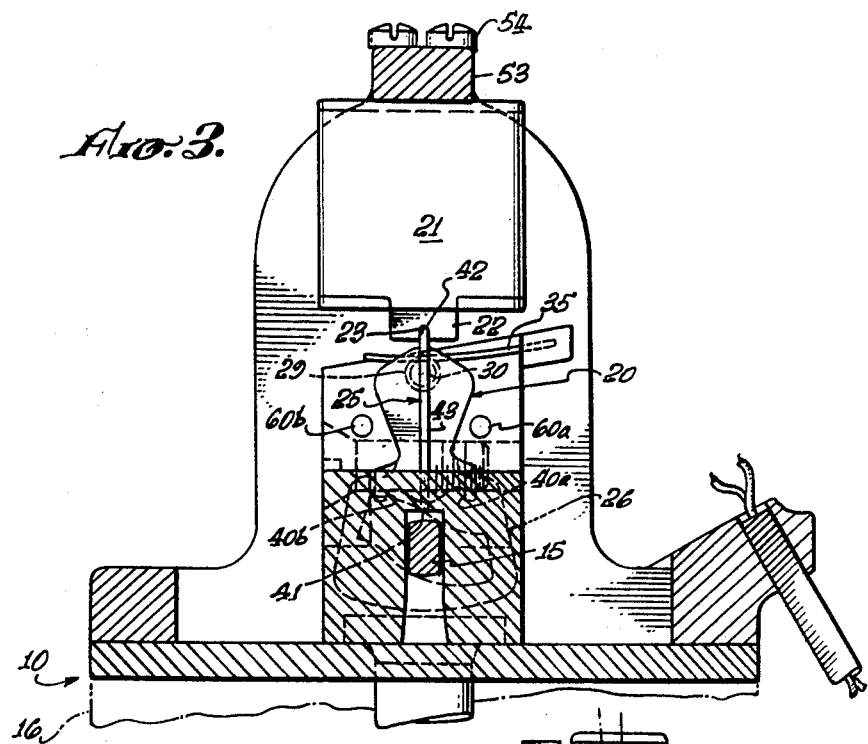
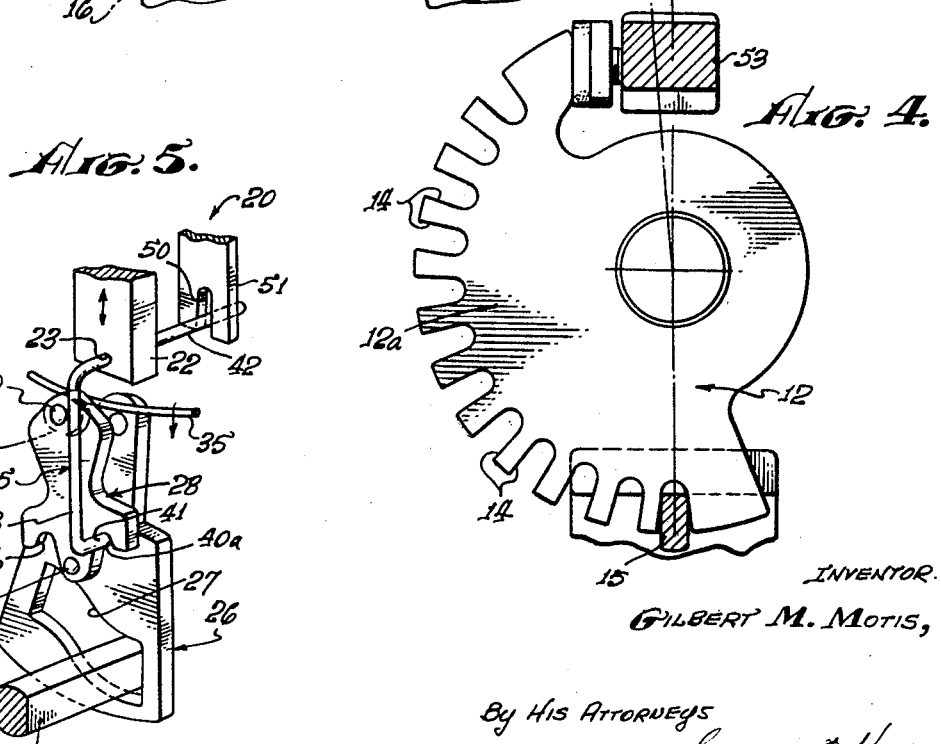
INVENTOR.
GILBERT M. MOTIS,
By His Attorneys
Spensley & Horn Sept. 16, 1969 G. M. MOTIS 3,466,944
SOLENOID ELBOW
Filed Aug. 22, 1966 3 Sheets-Sheet 3
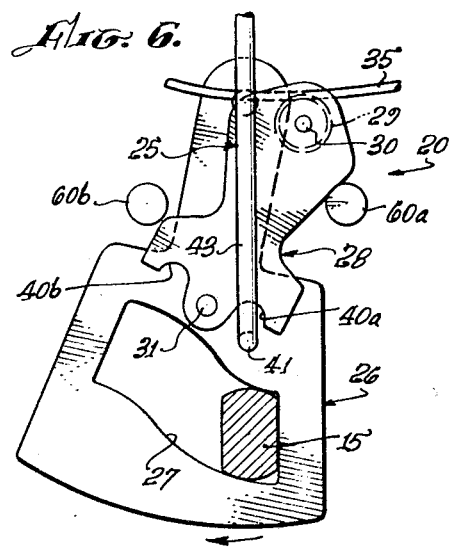
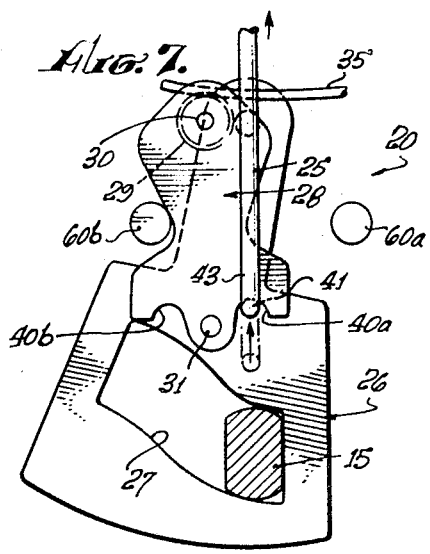
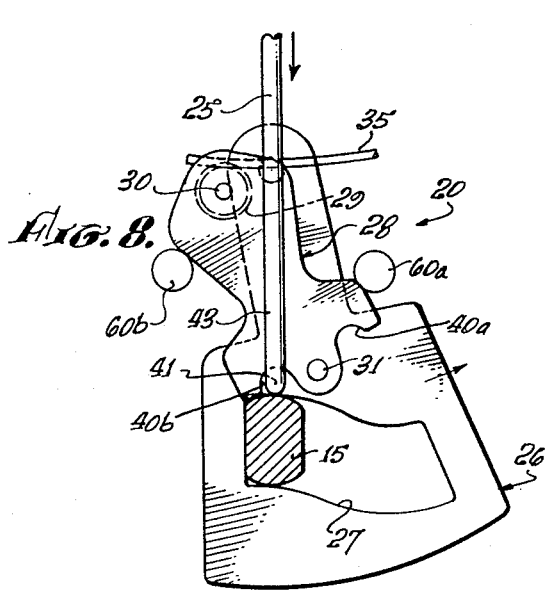
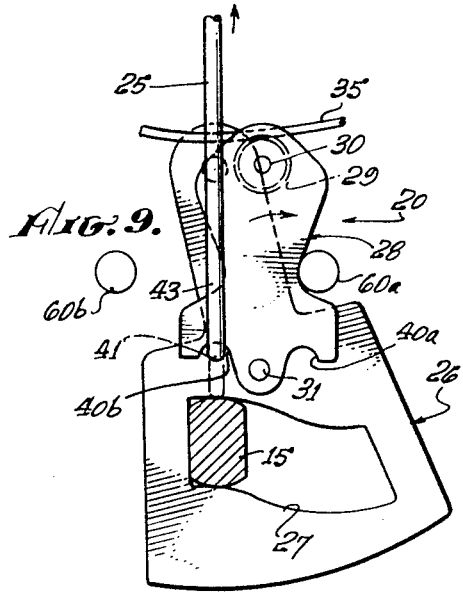
INVENTOR.
GILBERT M. MOTIS,
By HIS ATTORNEYS
Spensley & Horn

United States Patent Office 3,466,944
Patented Sept. 16, 1969

3,466,944
SOLENOID ELBOW
Gilbert M. Motis, 19434 Roscoe Blvd.,
Northridge, Calif. 91324
Filed Aug. 22, 1966, Ser. No. 574,184
Int. Cl. G05g *5/06;* A61f *1/06*
U.S. Cl. 74—527        12 Claims

ABSTRACT OF THE DISCLOSURE

A lock mechanism for artificial limbs having a first locking bar to which is operatively connected a cam; a second lock member in the form of a ratchet having radially disposed grooves. The first locking bar is adapted to cooperatively engage the radial grooves of the ratchet. The cam is operatively connected to the locking bar and upon the urgings of a solenoid means, is adapted to translate the first locking bar into an engaged or an unengaged position with the grooves of the ratchet in the second lock member. The cam is put into an activated, cocked position by a spring member and can be restored to an uncocked position. The cam has a carrying groove therein which upon the urgings of a bar activated by a solenoid moves the first locking bar into engagement or out of engagement with the grooves of the ratchet in the second locking member.

---

This invention relates to a mechanical locking assembly and, more particularly, to a locking mechanism which can remain in one of several conditions without maintenance of actuating energy.

Locking mechanisms which can be operated by momentary applications of energy are desirable in many different applications. They are particularly useful in control applications where momentary applications of energy are all that are available.

For example, in missile control systems and also in instrumentation systems, it may be desired that a momentary occurrence such as a temporary drop in pressure will create a momentary electrical signal which is desired to operate a mechanical lock on a control surface.

Also, many applications utilize a mechanical lock mechanism wherein solenoid operation is convenient and economical. In this type of application, however, the solenoid, in a particular condition to achieve a particular condition of the lock mechanism, requires that electrical energy be continuously applied to the solenoid coil. Accordingly, a constant drain is imposed on the power source. This creates problems such as requiring a large and heavy power source and further contributes to unreliability of the system since the constant current consumption creates heat which will shorten the life of a solenoid and may even make the use of solenoids impractical.

A particularly useful application of a lock mechanism is in a prosthetic device such as an elbow or knee joint where it is required to alternately lock and release the joint without a constant drain of power, particularly in the case of children who are not capable of directing sufficient attention to requirements of electrical devices to operate them properly.

Accordingly, it is an object of this invention to provide a locking mechanism which can be actuated to a locked condition by a momentary application of energy.

Another object of this invention is to provide a locking mechanism which can be released to an unlocked condition by a momentary application of energy.

Another object of this invention is to provide a locking mechanism which will, after a momentary application of energy, retain a memory of this direction, yet allow a motion to be completed until there is no load against the lock bar, at which time the actuation will be completed.

Another object of this invention is to provide a locking mechanism which is reliable in operation.

Another object of this invention is to provide a locking mechanism which is economical to manufacture.

Another object of this invention is to provide a locking mechanism which can be readily utilized in a prosthetic device.

The invention herein is a locking mechanism which can be put into one or the other of two conditions by a momentary application of energy. The mechanism comprises a lock bar and a receiving slot for receiving the lock bar to achieve a locked condition of the mechanism. A cam translates the lock bar from an unlocked condition to a locked condition and vice versa. Pivoted to the cam is a cocking link. The link is spring biased and operates upon the cam in conjunction with an actuating rod to move the lock bar from one condition to another after the link is cocked by the actuating lever. The actuating lever cocks the link to a predetermined position determined by a link stop. Upon release of the actuating lever, the biasing spring operating through the link operates the cam and causes the lock bar to change condition.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIGURE 3 is a view taken along line 3—3 of FIGURE 2;

FIGURE 4 is a view taken along line 4—4 of FIGURE 2 and showing the elbow of FIGURE 1 in a fully open locked condition;

FIGURE 5 is a fragmentary perspective view of the lock mechanism used in the device of FIGURE 1;

FIGURE 6 is a view of the mechanism of FIGURE 5 shown with the lock bar in an unengaged condition and the link uncocked;

FIGURE 7 is a view of the mechanism of FIGURE 5 shown with the lock bar in an unengaged condition and the link cocked for engaging the bar;

FIGURE 8 is a view of the mechanism of FIGURE 5 shown with the lock bar in an engaged condition and the link uncocked; and FIGURE 9 is a view of the mechanism of FIGURE 5 shown with the lock bar in an engaged condition and the link cocked for disengagement of the bar.

Figure 1:
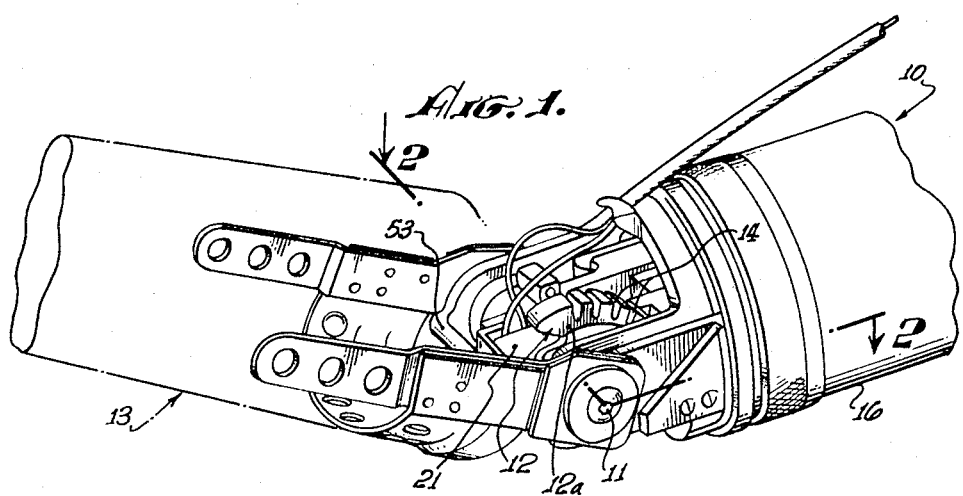
FIGURE 1 is a fragmentary perspective view of prosthetic elbow device incorporating a lock mechanism constructed in accordance with the invention.

Referring now to the drawing, a prosthetic elbow joint 10 is shown in FIGURE 1. The elbow joint 10 incorporates a lock mechanism contructed in accordance with this invention. When unlocked the elbow 10 can pivot freely about pivot 11. Affixed to the axis of pivot 11 is a circular lock receiver 12 which is engaged so as to rotate when the forearm 13 of the elbow 10 is moved. The upper section 12a of receiver 12 is generally circular and has a number of sequential slots 14 formed radially therein. A lock bar 15, as will be described hereinafter, is engaged in one of the slots 14 to lock the elbow 10 into a predetermined position. The bar 15 is stationary and extends perpendicular to receiver 12 so that when the bar is engaged in a slot 14, the forearm 13 of elbow 10 cannot rotate with respect to the upper arm 16. Thus, as is readily seen, the elbow 10 may be locked in any of many positions as determined by the number of slots 14 provided in receiver section 12a. As shown most clearly in FIGURE 4, a stop 53 is provided to predetermine the maximum rotation of the elbow 10. In FIGURE 4, the bar 15 is shown engaged in the endmost slot 14 to lock the elbow 10 in a position that retains the forearm 13 and upper arm 16 in a straight line orientation which, of course, simulates the position of a living elbow joint at its maximum outward rotation.

The heart of the invention is in the mechanism 20 utilized to change the bar 15 from an engaged condition to an unengaged condition with a receiver slot 14 and vice versa. The structure of this mechanism 20 is best seen in FIGURE 5. The actuating force for the mechanism 20 is provided by a solenoid 21. The armature 22 of solenoid 21 has a hole 23 drilled therein to accept actuator rod 25. The lock bar 15 is translated between lock and unlocked conditions by cam 26. The bar 15 is guided by slot 27 of cam 26. A cocking link 28 is pivoted freely to cam 26 by pivot 29 which is located above slot 27. Link 28 is spaced from cam 26 by spacer 32. In the space between cam 26 and link 28, there is a pulley 29 affixed to link 27 by rivet 30.

Figure 2:
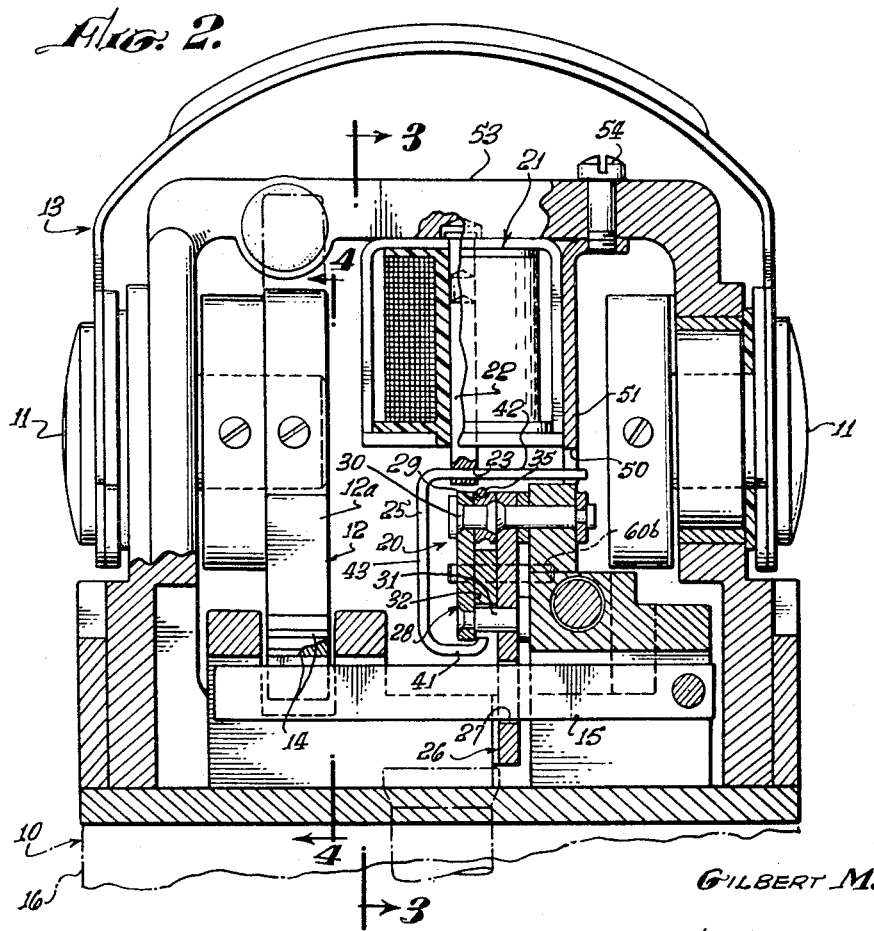
FIGURE 2 is a fragmentary view taken along line 2—2 of FIGURE 1.

Spacer 32 is held in place by shaft 31 of pivot 29. Shaft 31 is affixed to cam 26. The spacer 32 and link 28 both are free to rotate with respect to cam 26. Although pulley 29 need not rotate with respect to link 28, in the preferred embodiment it does rotate to reduce friction. A wire spring 35 bears upon pulley 29 in a downward direction. Link 28 has formed therein, one on each side of pivot 28, circular depressions 40 which receive the end 41 of rod 25. The rod 25 has three sections which are accomplished by two bends. Section 42 is retained, as described hereinabove, by armature 22 of solenoid 21. Section 42 extends through armature 22, as shown in FIGURE 5, and proceeds through a guide slot in guide bar 51. Guide slot 50 insures that the movement of actuating bar 25 will be positive and accurate. Slot 50 further, as is obvious, provides a limit to the upward travel of the bar 25 since bar 51 is rigidly affixed to metal frame 53 by bolt 54, as can be best seen in FIGURE 2. Section 43 of rod 25 is parallel to the broad surface of link 28 and is spaced therefrom by a sufficient distance to clear link 28. The spaced distance is thus not critical. The bar section 41 is a short section which is at right angles to section 43. Section 41 of the bar is located to engage during its motion with depressions 40 of link 28, as will be described more fully hereinafter.

Slot 27 of cam 26 is formed of a double arcuate section as shown best in FIGURE 5 with the upper and lower sides of slot 27 being parallel. The bottom and top of bar 15 is rounded to provide easy movement of the bar 15 in slot 27. As can be seen in the drawing, the right section of the slot 27 as viewed facing the drawing, retains bar 15 in the unlocked condition; the left section of slot 27 retains the bar 15 in the engaged or locked condition.

The operation of the device can be seen in FIGURES 6, 7, 8 and 9. In FIGURE 6 the actuating rod 25 is in its lowermost position, the solenoid is not energized, lock bar 15 is in an unengaged or unlocked condition, and link 28 is against stop 60a and maintained firmly in that position by spring 35 acting on the pulley 29. The center point 30 of pulley 29 is located substantially to the right of the pivot 31 of link 28. Thus, it is readily seen, that spring 35 is forcing link 28 against stop 60a and also forcing cam 27 against the right side of bar 15. Thus, in this condition the bar 15 is securely maintained in the unlocked condition.

In FIGURE 7 the solenoid has been energized thus raising the actuating rod 25. Rod 25 in its upward travel engages depression 40a of link 28. The force exerted by the rod 25 overcomes that of spring 35 and thus link 28 is rotated about pivot 29. The link 28 moves away from stop 60a and is stopped by stop 60b. The center point 30 of pulley 29 is now slightly to the left of pivot 29.

In FIGURE 8 the solenoid is released thus returning the actuating rod 25 to its lower position. The spring 35 now forces the link 28 to a position where center point 30 is substantially to the left of pivot 31 and cam 26 is shifted so that the spring 35 now keeps the slot 27 bearing securely upon the left side of bar 15 and thus maintains the bar 15 in the engaged or locked condition.

FIGURE 9 shows the solenoid actuated, and the actuating rod in the upper position which shifts link 28 to the right in the same manner as it shifted to the left as described hereinabove and thus the link 28 is now cocked so that when the solenoid is de-energized, the lock bar 15 will shift to the unlocked condition.

It is thus seen from the operation described hereinabove that a momentary application of energy to the solenoid, that is, application for just the short time necessary to lift actuating rod 25, will operate the locking mechanism and upon de-energization, the mechanism will shift rapidly and securely to another condition. That is, in effect, after a momentary application energy, the mechanism retains a memory of the energy application and thus upon de-energization is capable of completing a repositioning movement to a point at which there is no longer any load bearing upon lock bar 15.

In the preferred embodiment of the invention, the moving parts are made of aluminum because of its strength and lightness, however, the parts can readily be made of other metals or materials, such as nylon or plastic without sacrificing any of the advantages. Thus, there has been described herein, a novel locking mechanism for locking two rotating arms in various positions relative to each other. The mechanism is reliable and positive in its action and requires only a momentary application of energy for actuation.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:
1. A lock mechanism comprising:
   a first lock member;
   a second lock member having a top section and having at least one radially disposed groove in said top section, said first lock member being adapted to engage selectively with said grooves of said second lock member;
   a cam, said cam being operatively connected to said first lock member, said cam having a carrying groove therein and being adapted to carry said first lock member alternately between an engaged and unengaged condition with the grooves of said second lock member;
   electrically actuated means for cocking said cam to a cocked condition, said means being pivotally connected to said cam; and,
   biasing means for restoring said cam to an uncocked condition when electrical energy for activating the electrical actuating means for cocking said cam is removed, said means being connected to said cam.
2. A locking mechanism as claimed in claim 1 wherein said cocking means comprises a rotatable link, said link being cooperatively connected to said cam such that said link can respond to a rotating force applied by the electrical actuating means to rotate the cam into a cocked position.
3. A locking mechanism as claimed in claim 2 wherein said restoring means comprises a spring.
4. A locking mechanism as claimed in claim 3 wherein said link is pivoted to said cam and said spring bears upon said link.

5. A locking mechanism as claimed in claim 4 wherein said link has affixed thereto, a pulley, and said spring comprises a wire spring with one end thereof fixed, said spring bearing on said pulley.

6. A locking mechanism as claimed in claim 5 wherein said first lock member is a bar and said second lock member is a receiver having defined therein a slot, said slot adapted to receive said bar.

7. A locking mechanism for artificial limbs comprising:
   a first locking bar;
   a second locking member having a top section, said top section having at least one radial groove therein, said radial grooves being adapted to cooperatively engage said first locking bar;
   a cam having a carrying slot therein, said carrying slot being adapted to cooperatively engage and carry said first locking bar;
   a rotatable link means, said rotatable link means being rotatably connected to said cam and being adapted to rotate and to urge said cam into a cocked position;
   biasing means for restoring said cam to an uncocked position;
   electrically actuated means for rotating said rotatable link means;
   said biasing means being adapted to restore said cam to the uncocked position when energy is no longer supplied to electrically actuated means for rotating said rotatable link means.

8. The structure as defined in claim 7 wherein said electrically operated link means comprises a solenoid operated bar member.

9. A locking mechanism for artificial limb joints comprising:
   an artificial limb having a relatively stationary section and a ratchet member rotatably mounted on said section;
   a rotating section of said limb rotatably attached to the relatively stationary section, said rotatable section having attached thereto a bar member;
   a bar member located on said rotating limb section, said bar member being adapted to cooperatively engage the grooves of said ratchet located on said stationary member;
   a cam having a carrying slot, said carrying slot cooperatively engaging and carrying said bar member into an engaged position with the grooves of said ratchet means and out of engagement with the grooves;
   a rotatable link, said rotatable link being pivotally connected to said cam, said link being adapted to respond to forces exerted by an electrically actuated means, said rotatable link being adapted to cause said cam to rotate into a cocked position;
   spring means, said spring means being attached to said cam and being adapted to bias said cam into an uncocked position when energy is no longer supplied to said electrical actuating means;
   said cam being urged by said rotatable link into a cocked position with respect to said ratchet means thereby causing said bar member to engage a groove of said ratchet means and locking the movement of the rotating section of said artificial limb.

10. The structure as defined in claim 9 wherein said electrical actuating means is a solenoid and a solenoid operated bar member, said bar member being adapted to engage said rotatable link.

11. The structure as defined in claim 10 wherein a stop member is situated adjacent said ratchet means to limit the amount of rotation permitted said ratchet means.

12. The structure as defined in claim 10 wherein said spring member has a force sufficiently low to be overcome by the urgings of the electrically actuated bar member.

References Cited

UNITED STATES PATENTS 2,784,416    3/1957   Goodwin et al. _____ 3—12.2

FRED C. MATTERN, Jr., Primary Examiner

BERNARD T. CALLAHAN, Assistant Examiner

U.S. Cl. X.R.

3—12.2